US006036301A

United States Patent [19]

Amemiya et al.

[11] Patent Number: 6,036,301

[45] Date of Patent: Mar. 14, 2000

[54] INK JET RECORDING APPARATUS

[75] Inventors: Isao Amemiya, Tokyo; Chiaki Tanuma, Yokohama; Shiroh Saitoh, Kawasaki; Hitoshi Yagi; Noriko Yamamoto, both of Yokohama, all of Japan

[73] Assignee: Kabushiki Kaisha Toshiba, Kawasaki, Japan

[21] Appl. No.: 09/041,663

[22] Filed: Mar. 13, 1998

[30] Foreign Application Priority Data

Mar. 13, 1997 [JP] Japan .................................... 9-059325

[51] Int. Cl.[7] ...................................................... G01D 15/16

[52] U.S. Cl. ................................................. 347/46; 347/70

[58] Field of Search .................................. 347/68, 70, 71, 347/46

[56] References Cited

U.S. PATENT DOCUMENTS

| | | | |
|---|---|---|---|
| 4,719,480 | 1/1988 | Elrod et al. ............................... | 347/46 |
| 5,339,101 | 8/1994 | Rawson et al. ........................... | 347/46 |

FOREIGN PATENT DOCUMENTS

| | | |
|---|---|---|
| 57-188370 | 11/1982 | Japan . |
| 4-276450 | 10/1992 | Japan . |
| 5-016352 | 1/1993 | Japan . |
| 5-254116 | 10/1993 | Japan . |

*Primary Examiner*—Robert Beatty
*Attorney, Agent, or Firm*—Oblon, Spivak, McClelland, Maier & Neustadt, P.C.

[57] ABSTRACT

An ink jet recording apparatus includes an ink holding chamber, an ultrasonic wave generator having a piezoelectric transducer structure consisting of a piezoelectric member, and first and second electrodes formed on opposing surfaces of the piezoelectric member, and a driver for driving the piezoelectric transducer structure. The piezoelectric transducer structure is coupled acoustically with the ink liquid. The apparatus further includes ultrasonic wave focusing member formed on the ultrasonic wave generator and including an acoustic lens for focusing an ultrasonic wave generated from the ultrasonic wave generator in a vicinity close to a surface of the ink liquid, and a supporting member for supporting the ultrasonic wave generator on an opposite side to the ultrasonic wave focusing member. The supporting member supports the ultrasonic wave generator via an ultrasonic wave canceling medium, in a region corresponding to an overlapping region between the piezoelectric transducer structure and the acoustic lens.

8 Claims, 4 Drawing Sheets

INK JET RECORDING APPARATUS

BACKGROUND OF THE INVENTION

The present invention relates to an ink jet recording apparatus in which liquid ink is made into droplets, that are flown onto a recording sheet, so as to record an image, and more particularly, to an ink jet recording apparatus in which ink droplets are ejected and flown onto a recording sheet by the pressure of an ultrasonic wave beam radiated from a piezoelectric element or elements.

An apparatus of recording an image with image dots formed by making liquid ink into droplets and flying them on a recording sheet is practically used as an ink jet printer. The ink jet printer entails advantages that noise is low as compared to other recording mode printing apparatus, and the process of development, fixation or the like are unnecessary. Thus, the ink jet printer draws much attention as a plain paper recording technique. Up to the present day, a great number of ink jet printer modes have been proposed. In particular, the mode of emitting ink droplets by the pressure of vapor generated by heat of a heat generator, discussed in Jpn. Pat. Appln. KOKOKU Publications No. 56-9429 and No. 61-59911, and the mode of emitting ink droplets by a pressure pulse made by the displacement of a piezoelectric member, discussed in Jpn. Pat. Appln. KOKOKU Publication No. 53-12138, are typical examples of the ink jet printer.

However, with the above-described modes, local concentration of ink is likely to occur due to the evaporation or volatilization of the solvent used. In addition, individual nozzles each corresponding to a respective resolution are very slender, and thus the nozzles may readily be plugged. Particularly, in the mode of utilizing the vapor pressure, the adhesion of an undissolved matter created by the thermal or chemical reaction with the ink easily causes the plugging up of a nozzle, whereas in the mode of utilizing the pressure generated by the displacement of a piezoelectric member, the complex structure including the ink passage even more readily causes the plugging up of the nozzle. In a serial head which employs several tens to a hundred and several tens of nozzles, the frequency of the occurrence of the plugging up can be suppressed; however in the case of a line head which requires several thousand nozzles, the plugging up occurs very frequently, which creates a serious drawback of low reliability. Furthermore, these modes are not suited for improving resolution.

To overcome the above-described drawbacks, there has been proposed a mode of utilizing an ultrasonic wave in which ink droplets are emitted from the surface of liquid ink with use of the pressure of an ultrasonic beam generated from the thin film piezoelectric member (see, for example, IBM TDB, vol. 16, No. 4, page 1168 (1973-10), Jpn. Pat. Appln. KOKAI Publication No. 63-162253). This mode is of a so-called nozzleless type which does not require a nozzle for each and individual dot, or a separation wall between ink passages. Therefore, it is free from the problem entailed in the line head, that is, the plugging up or the restoration of the nozzle from the plugging up. Further, with the ultrasonic wave mode, it is possible to emit an ink droplet of a very small diameter, in a stable manner, and therefore a high resolution can be achieved. However, the ultrasonic wave mode has a low ink droplet flight rate, and as a result, the image recording rate cannot be improved.

In addition, in a typical structure of the head of the conventional ultrasonic wave mode ink jet recording apparatus, acoustic lenses which constitute ultrasonic wave focusing means, especially, Fresnel lens, are made to serve as a supporting members for an ink holding chamber for reserving and holding ink liquid therein. Therefore, in order to improve the mechanical strength of the supporting members, the Fresnel lens is made to have a sufficient thickness as compared to that of the piezoelectric member, which is equal to or larger than the depth of the ink liquid. With this structure, an ultrasonic wave radiated from a piezoelectric element attenuates and/or scatters while it is propagated within the Fresnel lens due to its thickness, and therefore it is very difficult to radiate the ultrasonic wave into the ink liquid at high efficiency. Particularly, in the case where an ultrasonic wave having a high frequency is radiated in order to emit an ink droplet of a small diameter, the attenuation or scattering of the ultrasonic wave within the Fresnel lens causes a great influence on the performance of the apparatus.

As described above, with the conventional mode or structure, it is very difficult to emit or fly ink droplets at high efficiency, and for the high efficiency, it is conventionally required to apply an excessive voltage to the piezoelectric element, and prolong the time for applying a voltage. As a result, the conventional technique entails the problems of an increased consumption power and a low image recording speed.

BRIEF SUMMARY OF THE INVENTION

The present invention provides a solution to the problems of the conventional technique.

Therefore, it is an object of the present invention is to provide an ink jet recording apparatus, in which the ink droplet emitting or flying efficiency is improved at less consumption power while using a high-frequency ultrasonic wave, so as to shorten the time period from when the piezoelectric element is driven until an ink droplet is emitted or flown, thus achieving a high-speed recording.

To achieve the above-described object, according to the present invention, there is provided an ink jet recording apparatus comprising: an ink holding chamber for holding ink liquid therein; ultrasonic wave generating means having a piezoelectric transducer structure comprising a piezoelectric member, and first and second electrodes formed on opposing surfaces of the piezoelectric member, the piezoelectric transducer structure being coupled acoustically with the ink liquid; drive means for driving the piezoelectric transducer structure; ultrasonic wave focusing means provided over the ultrasonic wave generating means and including an acoustic lens for focusing an ultrasonic wave generated from the ultrasonic wave generating means in a vicinity close to a surface of the ink liquid; and a supporting member for supporting the ultrasonic wave generating means on an opposite side to the ultrasonic wave focusing means, wherein the supporting means supports the ultrasonic wave generating means with an ultrasonic wave canceling medium in a region corresponding to an overlapping region between the piezoelectric transducer structure and the acoustic lens.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
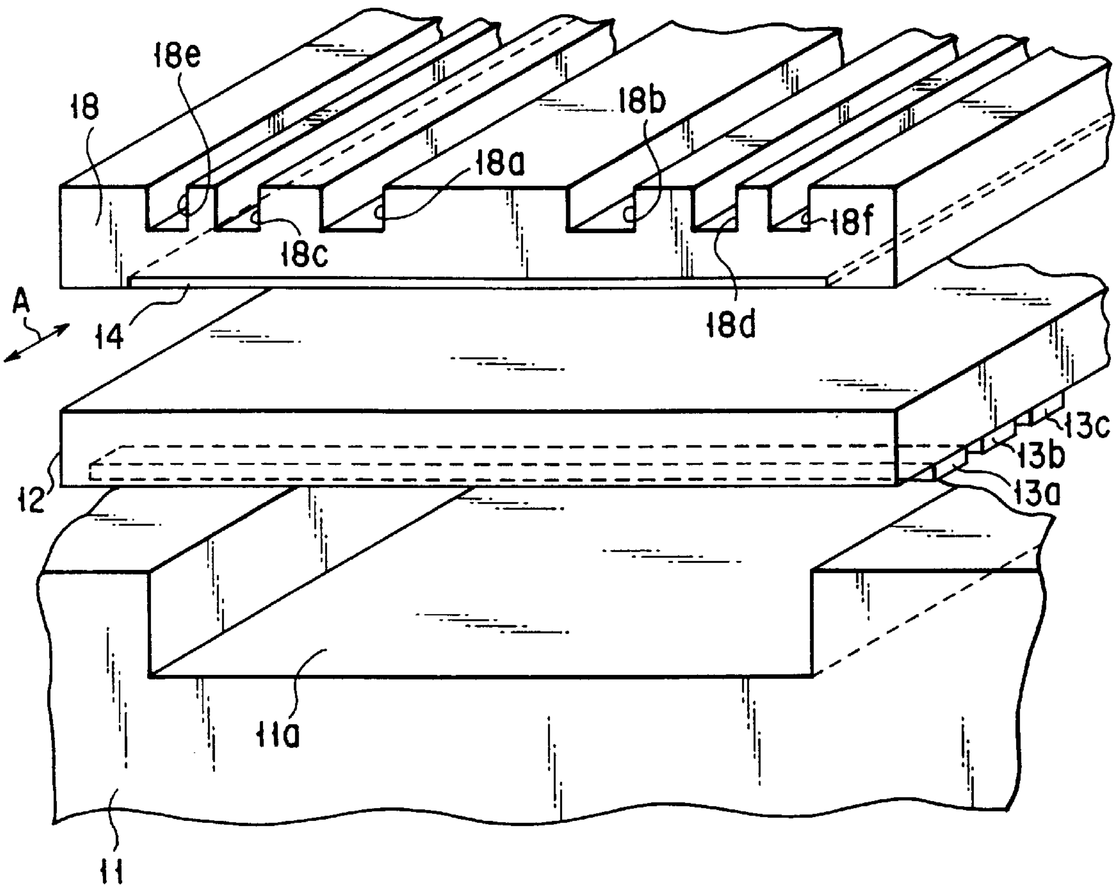
FIG. 1 is an exploded perspective view illustrating the general relationship among a piezoelectric element, an acoustic lens and a supporting member in an ink jet recording apparatus according to the present invention.

The inventors of the present invention has already proposed, prior to the present invention, an ink jet recording apparatus of recording an image by ejecting an ink droplet from the surface of liquid ink by the pressure of a radiated ultrasonic wave beam, and emitting the ink droplet on a recording sheet. Such apparatus comprises a plurality of piezoelectric elements arranged at a predetermined interval, and drive means (linear electronic scanning means) for driving part of the piezoelectric elements in group (drive element group) by imparting a predetermined phase difference to them so as to focus the ultrasonic wave beam in the vicinity of the surface of the surface of ink liquid, and emit ink droplets, and for moving the drive element group in a predetermined direction.

These inventors have further proposed, in connection with the just-described ink jet recording apparatus, a structure in which the supporting function is removed from the acoustic lens, and a supporting member, independent of the acoustic lens, is provided in the rear surface of the piezoelectric elements, so as to suppress the lowering of the ink droplet emitting or flying efficiency, which is caused by the attenuation or scattering of the ultrasonic wave occurring while it is propagated within an acoustic lens having a great thickness. In this case, since it is not required that an acoustic lens, especially Fresnel lens, have a further function as a supporting member, the thickness of the lens may be set at the necessary minimum value for focusing the ultrasonic wave. That is, it suffices if the acoustic lens has a thickness approximately the same as that of a piezoelectric member, which is sufficiently thin as compared to the depth of the ink liquid. With this structure, the attenuation and/or scattering of an ultrasonic wave within an acoustic lens can be suppressed to a negligible level, thereby improving the ink droplet emitting or flying efficiency, and increasing the recording speed. In the case where the ultrasonic wave focusing means is made of a Fresnel lens, the thickness of each of depressed and projecting portions is set to be close to (2n+1)/4 (where n is an integer of 0 or more) times of the wavelength of an ultrasonic wave propagating in the Fresnel lens, and the Fresnel lens is made of a material having an acoustic impedance value close to a square root of the product of the acoustic impedance of the piezoelectric member and that of the ink liquid. Thus, the Fresnel lens can be made to have an additional function of an acoustic matching layer. With this structure, the reflection of the ultrasonic wave at the interface is suppressed, and therefore the ink droplet emitting or flying efficiency can be further improved.

However, in order to further improve the recording speed, it is necessary to achieve a higher efficiency for the emission of ink droplets, and the present inventors have conducted intensive studies while carrying out experiments and simulations. During the studies, it was found that during the application of a driving pulse, an ink droplet is not emitted immediately, and after a time period of ten times or more of the application time, an ink droplet is emitted for the first time. The mechanism for the emission is considered as follows. That is, an ultrasonic wave radiated into the ink liquid is multiple-reflected between the ultrasonic wave radiating surface of the recording head and the surface of the ink liquid, and due to the standing wave created by the multiple reflection, a meniscus is gradually grown in the surface of the ink liquid. Further, when the growth of the meniscus exceeds the threshold value, an ink droplet is then emitted. In other words, since the drive pulse uses a burst wave which matches with the resonance frequency of the piezoelectric element, it is effective to enlarge the amplitude of the burst wave and increase the wave number, for the improvement of the droplet emitting rate.

It should be noted that the ultrasonic wave generated by the resonance of the piezoelectric element is radiated not only to the ink liquid and acoustic lens side, but also onto the side of the supporting member situated on the rear surface of the piezoelectric element. The ultrasonic wave radiated to the supporting member side is reflected by the rear surface of the supporting member, and returned again to the piezoelectric element side. Then, a portion of the wave is propagated in the acoustic lens and the ink liquid, and interferes with ultrasonic waves radiated originally to the acoustic lens and ink liquid side, thus lowering the intensity of the waves.

It was further found that this problem can be solved effectively by the technique in which the surface of the supporting member, situated on the opposite side to the piezoelectric element, is processed into a recessed shape or a rectangular shape, so as to deflect a reflection wave from the direction of the piezoelectric element, or by the technique that a material having an acoustic impedance larger than that of the piezoelectric element, and a high wave-attenuating property is provided on the rear surface brought into contact with the piezoelectric element.

However, for solving the essence of the problem of a low droplet emitting rate caused by the reflection wave from the supporting member side of the piezoelectric element, it was found very effective to provide a medium having an acoustic impedance extremely lower (1/100 or less) than that of the piezoelectric element, such as air or gas, to be in contact with the rear surface of the piezoelectric member or body. In other words, the present invention provides an ink jet recording apparatus having a structure in which the ultrasonic wave generating means including a piezoelectric element or elements is supported by a supporting member from the opposite side to the ultrasonic wave focusing means, characterized in that the supporting member supports the ultrasonic wave generating means in non-contacting state with the piezoelectric elements in a region corresponding to the overlapping region between the piezoelectric element and the acoustic lens placed thereon. Thus, air is usually present between the piezoelectric element and the supporting member, and in some case, it is possible to place an inert gas (having an acoustic impedance of 1/100 or less of that of the piezoelectric member) therebetween, and therefore an interface which cancels an ultrasonic wave radiated from the ultrasonic wave generating means to the supporting member side, is established between the rear surface of the piezoelectric element and such a material or medium. With this structure, substantially, not only the radiation of ultrasonic wave from the piezoelectric element to the rear surface side can be prevented, but also the vibration of the piezoelectric element is not damped. Consequently, it is possible that an ultrasonic wave having a very large amplitude may be radiated into the acoustic lens, which constitute the ultrasonic wave focusing means, and ink liquid. It should be noted that the same effect can be obtained in the case where the space defined by the non-contact section (a hollow structure) between the piezoelectric element and supporting member is maintained in a vacuum state.

In order to support the piezoelectric element through a medium, such as air, having an extremely low acoustic impedance and an extremely low rigidity on its rear surface, it is preferable that the ultrasonic wave generating means should be supported by a region other than that corresponding to the overlapping region between the piezoelectric element, which actually vibrates to radiate an ultrasonic wave, and the acoustic lens. For example, it is possible that the piezoelectric member or body which constitutes the piezoelectric element is extended out therefrom, and supported using the extending portion by the supporting member. With this structure, it is able to support the ultrasonic wave generating means without being in contact with the piezoelectric element.

It should be noted that a piezoelectric element is made of a piezoelectric member or body, and first and second electrodes, and the region where the first and second electrodes overlap with each other, serves as an effective piezoelectric element.

The present invention will now be described in further detail with reference to accompanying drawings. Throughout the drawings, the same or similar structural members will be designated by the same reference numerals.

First, a general correlation among the piezoelectric element, acoustic lens and supporting member in the ink jet recording apparatus according to the present invention will now be described with reference to FIG. 1.

As can be seen in FIG. 1, a first electrode 13 and a second electrode 14 are provided on two opposing major surfaces of a plate-like piezoelectric member or body 12. The first electrode 13 consists of stripe-like sub-electrodes 13*a*–13*c* each formed to have a length equal to a width of the piezoelectric member 12. These sub-electrodes are spaced apart from each other and are arranged in parallel. In the present specification and claims, the direction in which sub-electrodes are arranged (indicated by arrow A in FIG. 1) is referred to as the "main scanning direction" of the ink jet recording apparatus. The second electrode 14 is formed, for example, over the entire region of the piezoelectric member 12 except for both ends which are exposed. The piezoelectric member 12, and the electrodes 13 and 14 formed on the opposing surfaces of the member 12 are collectively referred to as a "piezoelectric transducer structure" herein. An effective piezoelectric element is constructed as an overlapping region between each of the sub-electrodes of the first electrode 13 and the second electrode 14, of the piezoelectric transducer structure, in the direction normal to the main scanning direction, (referred to as a "sub-scanning direction", herein). In the example shown in FIG. 1, the first electrode 13 consists of a plurality of stripe-like sub-electrodes, and therefore the number of effective piezoelectric elements corresponds to the number of stripe-like electrodes.

A Fresnel lens 18 serving as an acoustic lens is formed on the piezoelectric transducer structure. As will be explained later in detail, the Fresnel lens is prepared by making grooves 18*a* to 18*f* in a Fresnel lens member to extend in the main scanning direction to be parallel with each other, according to the Fresnel zone theory.

In the present invention, the piezoelectric transducer structure is supported by a supporting member via an ultrasonic wave canceling medium, on an opposite side to the Fresnel lens 18 and at the section corresponding to the overlapping region between the piezoelectric element and the Fresnel lens 18. Consequently, in the example shown in FIG. 1, the piezoelectric transducer structure is supported by a supporting member 11 in which a groove 11*a* extending in the main scanning direction, is made in the region corresponding to the Fresnel lens 18. Needless to mention, the length (width) of the groove 11*a* in the sub-scanning direction may be larger. It should be noted that in a general case, the length of the second electrode 14 in the sub-scanning direction coincides with the length of the Fresnel lens in the sub-scanning direction.

Figure 2:
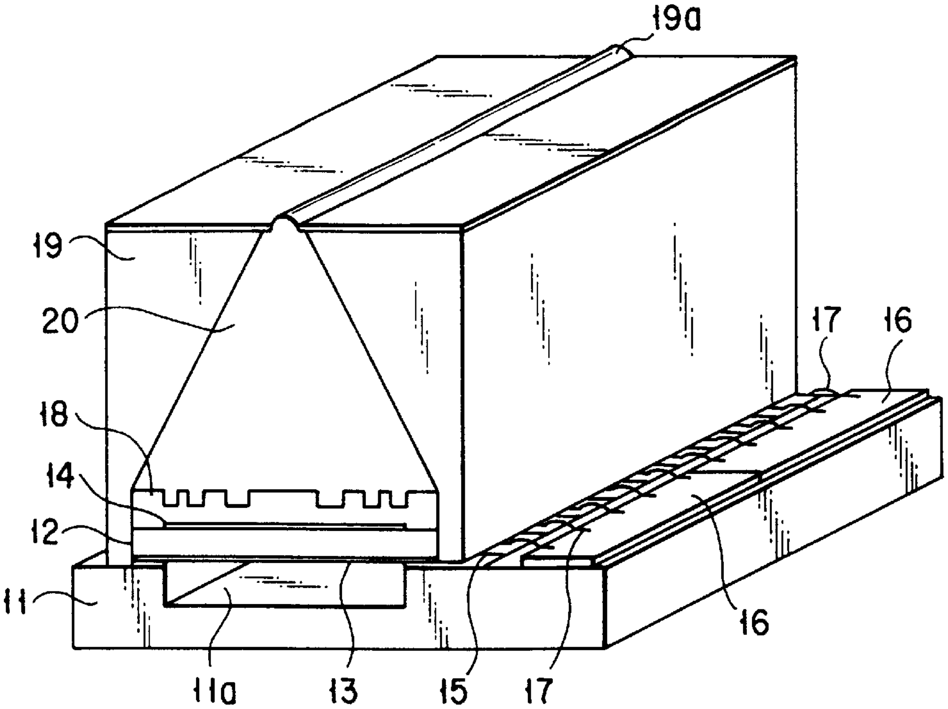
FIG. 2 is a perspective view schematically illustrating a head portion of an ink jet recording apparatus according to a first embodiment of the present invention.

FIG. 2 is a schematic perspective view of the head portion of an ink jet recording apparatus according to a first embodiment of the present invention. As can be seen in FIG. 2, the plate-like piezoelectric member 12 which constitutes part of ultrasonic wave generating means is provided on the supporting member 11 in which a groove 11*a* is formed, so as to cross the groove 11*a*.

The piezoelectric member 12 may be made of a ceramic material such as lead titanate (PT), lead zircon titanate (PZT), a polymeric material such as a copolymer of vinylidene fluoride with ethylene trifluoride, a monocrystalline material such as lithium niobate, or a piezoelectric semiconductor material such as zinc oxide, depending upon the frequency of the ultrasonic wave, the size of the element or the like. The supporting member 11 may be made of a material such as glass.

The first electrode 13 consisting of a plurality of stripe-like individual sub-electrodes space apart from each other is formed on the lower surface of the piezoelectric member 12 such as to have a length substantially equal to the length of the piezoelectric member 12 in the sub-scanning direction. The piezoelectric member 12 is divided functionally into a plurality of discrete piezoelectric elements by the sub-electrodes of the electrode 13. An integral common electrode (the second electrode) 14 is formed on the upper surface of the piezoelectric member 12. These electrodes 13 and 14 can be formed in the form of thin films by depositing or sputtering a metal material such as titanium, nickel, aluminum, copper, gold, or the like. Alternatively, the electrodes 13 and 14 can be formed by printing a mixture obtained by mixing glass frit into silver paste by the screen printing technique, followed by baking.

Further, on one end side of the supporting member 11, a plurality of array electrodes 15 are formed at the same interval as that of the sub-electrodes 13 formed on the lower surface of the piezoelectric member 12. The array electrodes 15 formed on the supporting member 11 are matched respectively with the sub-electrodes 13 on the lower surface of the piezoelectric member 12, and they are adhered to each other under pressure by a conductive adhesive, thus electrically connecting to each other. Each of the array electrodes 15 on the supporting member 11 is connected to a drive circuit 16 provided on an edge portion of the supporting member 11 by a bonding wire 17. Further, a common electrode 14 formed on the upper surface of the piezoelectric member 12 is connected to the drive circuit 16 by a wire which is not shown in the Figure.

A one-dimensional Fresnel lens 18 serving as an acoustic lens which also has the role of an acoustic matching layer, is formed on the piezoelectric member 12 through the common electrode. The Fresnel lens 18 is made to have grooves arranged at a predetermined pitch on the basis of the Fresnel zone theory, and is designed to shift the phase of an ultrasonic wave radiated from the upper and bottom surfaces of a groove, by a half of its wavelength. The grooves are made to be in parallel to each other in the main scanning direction. The acoustic matching layer is designed to obtain acoustic matching between the piezoelectric element and ink liquid. Therefore, it is preferable that the acoustic matching layer should be made of a material having an acoustic impedance value ($Z_m$) close to a square root of the product of an acoustic impedance $Z_p$ of the piezoelectric member and an acoustic impedance $Z_i$ of the ink liquid, that is: $((Z_p \times Z_i)^{1/2})$. Some of the examples of such an acoustic matching material are an epoxy resin, a polymeric material such as polyimide, and a mixture in which fiber, or powder of alumina, tungsten or the like is mixed into the high molecular material so as to adjust the acoustic impedance. In the embodiment shown in FIG. 2, the Fresnel lens 18 functions also as an acoustic matching layer, and therefore it is preferable that this lens should be made of such a material. Since the Fresnel lens 18 serves also as an acoustic matching layer, it is further preferable that the thickness of the lens taken from the lower surface to the upper surface of the grooves, and the thickness $t_m$ taken from the lower surface to the bottom surface of the groove should satisfy the following equation:

$$t_m=\{[(2m+1)/4]\times\lambda_m\}\times(1\pm0.2)$$

where m represents an integer of 0 or larger, and $\lambda_m$ is the wavelength of an ultrasonic wave propagating in the Fresnel lens.

Further, on the supporting member 11, an ink holding chamber 19 is provided holding ink liquid 20 and enclosing the piezoelectric transducer structure and the Fresnel lens 18. The ink holding chamber 19 has such a structure that side walls which surround the ink liquid 20 are inclined towards each other to meet at the above end, from both ends of the Fresnel lens layer, and a slit 19*a* is opened at the above end.

As described above, in the ink jet recording apparatus shown in FIG. 2, the sub-electrodes 13 formed on the lower surface of the piezoelectric member 12 have a length substantially the same as the length of the piezoelectric member 12. However, the common electrode 14 is formed on the upper surface of the piezoelectric member 12 such that the electrode is formed on the portion excluding the both end portion of the piezoelectric member 12, to cover an effective width as the acoustic lens of the Fresnel lens 18. Therefore, the portion of the piezoelectric member 12, which functions as each piezoelectric element, is solely a region corresponding to the common electrode 14. In other words, the piezoelectric member 12 extends in both sides of the piezoelectric element, and the piezoelectric member 12 is supported by the supporting member 11 by the extending portions. Further, the groove 11*a* made in the supporting member 11 has a width which substantially matches with the width of the common electrode 14. That is, the piezoelectric element of the portion of the piezoelectric member 11, which is interposed between the sub-electrodes 13 and the common electrode 14, is located above the groove 11*a*. In other words, the lower side of the piezoelectric element has a hollow structure, and with this structure, it is placed in a non-contact state with respect to the supporting member 11.

In order to carrying out a recording operation, a drive element group consisting of part of a plurality of piezoelectric elements functionally divided by the sub-electrodes 13 is driven at the same time, and the ultrasonic wave is focused to the vicinity of the surface of the ink liquid, so as to emit an ink droplet. During this period, the ultrasonic wave radiated from the piezoelectric element to the rear side thereof, is canceled by the air usually present in the groove 11*a* located in the rear surface of the piezoelectric element, and is not reflected on the side of the ink liquid 20.

Next, an example of the method of focusing an ultrasonic wave and the method of driving a piezoelectric element of the ink jet recording apparatus, will be described. In the method of focusing an ultrasonic wave in the main scanning direction, a predetermined delay time is set to a piezoelectric element group consisting of part of piezoelectric elements each made of a piezoelectric member 12, which are operated in a sub-array manner by the sub-electrodes 13, and those of the element group (simultaneous drive element group) are driven at the same time. The phase of the ultrasonic wave radiated from each piezoelectric element is controlled such as to increase the intensity of the ultrasonic wave regionally in the vicinity of the surface of the link liquid. More specifically, the longest delay time is set for the central portion of the simultaneous drive element group, and the delay time is gradually shortened towards the outer side. The focusing of an ultrasonic wave in the sub-scanning direction is carried out by an acoustic lens, that is, the Fresnel lens 18 in this example. As the ultrasonic wave is focused from the two directions as described above, an ink droplet can be ejected and emitted from a desired position on the surface of the ink liquid, by the pressure of the ultrasonic wave. The ink droplet emitting position can be varied by electronically scanning the piezoelectric element group driven at the same time. Further, of the piezoelectric elements arranged in array, when a plurality of simultaneous drive element groups such as above are provided, a plurality of ink droplets can be emitted at the same time.

In the other method, the simultaneous drive elements are divided into two groups on the basis of the Fresnel zone theory, and the timing for driving one group is shifted by $\pi$ with respect to the other group. Such an operation is called Fresnel's drive.

When the degree of focusing of ultrasonic wave in the sub-scanning direction is high, it suffices, regarding the main scanning direction, if a plurality of elements are driven at the same time, without having to set a delay time for the focusing, and thus a delay time does not have to be given, for emitting an ink droplet.

Figure 3:
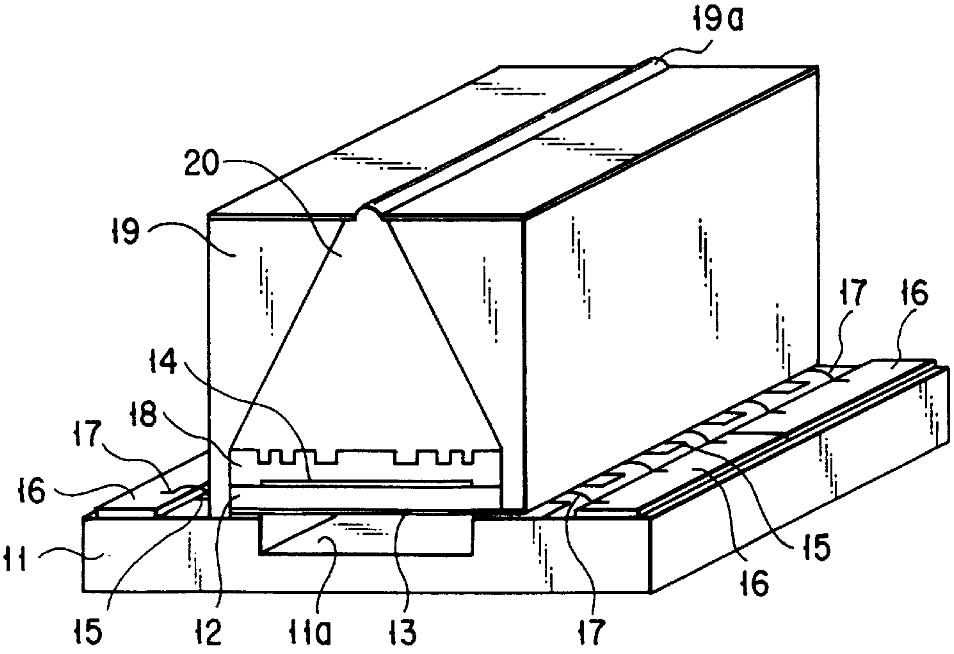
FIG. 3 is a perspective view schematically illustrating a head portion of an ink jet recording apparatus according to a second embodiment of the present invention.

FIG. 3 is a perspective view of a head portion similar to that of the ink jet recording apparatus shown in FIG. 2, except that the arrangement of the array electrodes on the supporting member 11 is different from the case of FIG. 2. In this embodiment, the array electrodes 15 on the supporting member 11 are provided such that they are drawn to right and left sides alternately with respect to the sub-electrodes 13 formed on the lower surface of the piezoelectric member 12. Further, the drive circuit 16 is provided on both sides of the supporting member 11. With such an arrangement in which sub-electrodes of the piezoelectric elements are connected via wire to array electrodes to right and left sides alternately, it is possible to reduce the density of the bonding wires and drive circuits to a half, and therefore the mounting of the elements becomes very easily. This structure is effective particularly for the case where the arrangement pitch for the piezoelectric elements is set for high density, so as to achieve a high resolution.

Figure 4:
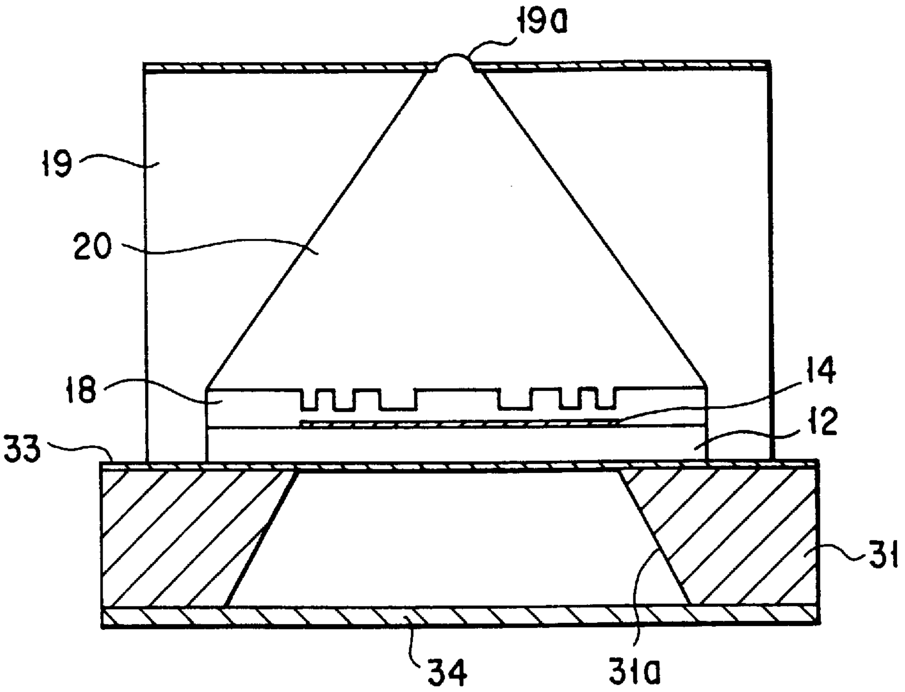
FIG. 4 is a cross-sectional view schematically illustrating a head portion of an ink jet recording apparatus according to a third embodiment of the present invention.

FIG. 4 is a cross-sectional view of the head portion of the ink jet recording apparatus according to another embodiment, which is similar to the first embodiment, except for the hollow structure located between the supporting member 11 and the piezoelectric element in the ink jet recording apparatus. A silicon substrate is used as the supporting member 31, and a stripe-shaped sub-electrode 33 formed by integrating the sub-electrodes 13 and the array electrode 15 into one unit is formed on the entire upper surface of the substrate. Then, the piezoelectric member 12 is formed on the sub-electrode 33, and the rear surface region of the piezoelectric element is removed by carrying out anisotropic etching from the rear surface of the substrate 31, thus forming a hollow structure. In order to maintain the mechanical strength of the substrate 31 after the etching, a reinforcing plate 34 is provided on the entire rear surface of the substrate 31. With this technique, a hollow structure can be easily formed in the rear surface of the piezoelectric element, and the step of adhering a sub-electrode and a respective array electrode by pressure becomes unnecessary; therefore the yield is further improved in the manufacture.

Figure 5:
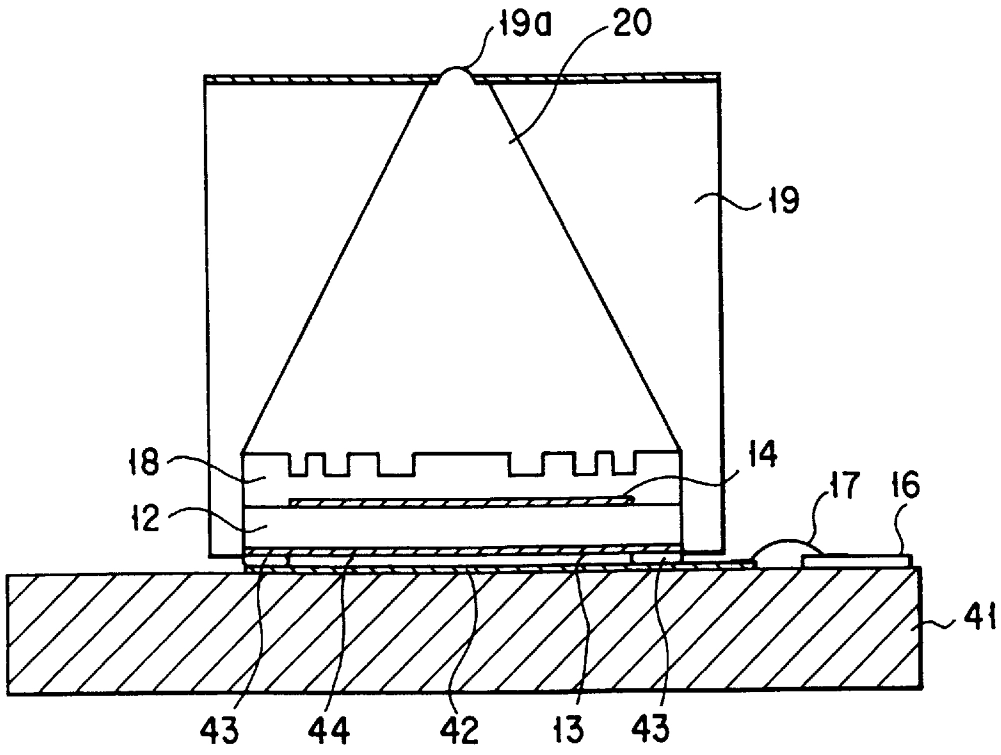
FIG. 5 is a cross-sectional view schematically illustrating a head portion of an ink jet recording apparatus according to a fourth embodiment of the present invention.

FIG. 5 is a cross-sectional view of the head portion of the ink jet recording apparatus according to the fourth embodiment, which is similar to the first embodiment, except for the hollow structure located between the supporting member 11 and the piezoelectric element in the ink jet recording apparatus, and the manner of drawing the array-shaped sub-electrodes. A special groove is not formed in the supporting member 41, and the array electrode 42 corresponding the sub-electrodes 13 formed on the piezoelectric member 12 is formed in a region larger than the sub-electrodes 13. Further, the piezoelectric member 12 is provided on the supporting member 41 via a conductive bump 43 such as solder, made to electrically connecting the sub-electrodes 13 to the array electrode 42. With use of the bump 43 as described above, a gap 44 is created between the supporting member 41 and the piezoelectric member 12 (that is, the piezoelectric element), and thus a hollow structure can be easily made in the rear surface of the piezoelectric element.

Figure 6:
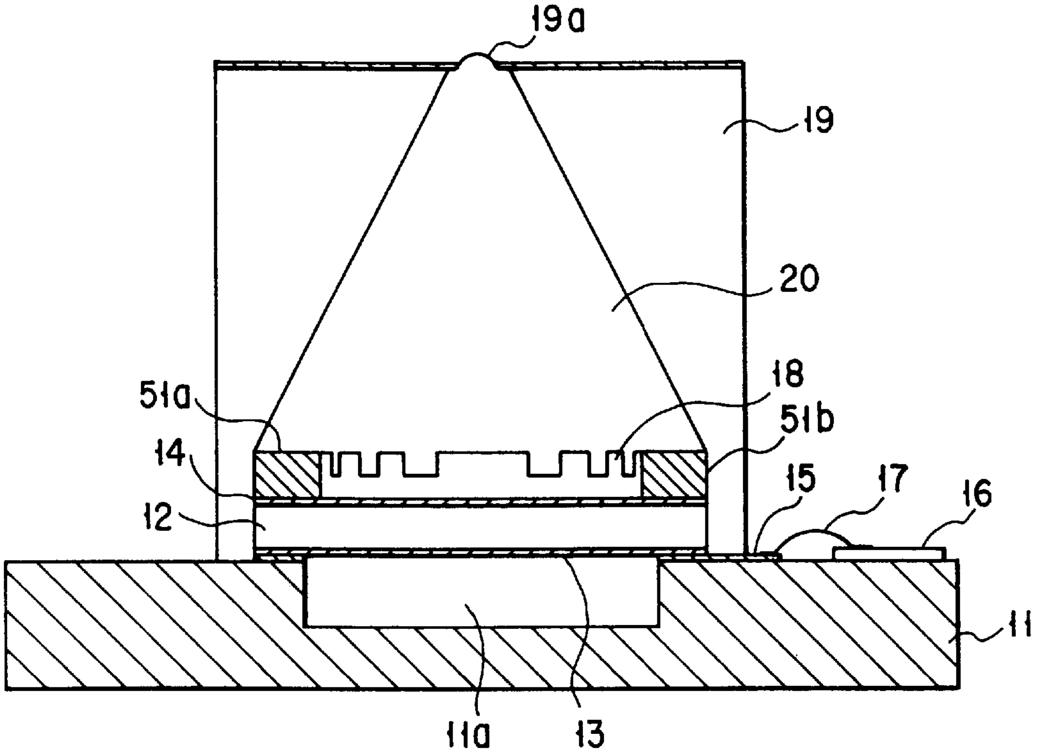
FIG. 6 is a cross-sectional view schematically illustrating a head portion of an ink jet recording apparatus according to a fifth embodiment of the present invention.

FIG. 6 is a diagram showing an ink jet recording apparatus according to another embodiment, having a structure similar to that of the second embodiment, except that the second electrode (common electrode) 14 is formed to have a length (width) equal to a length (width) of the piezoelectric member 12 in the sub-scanning direction, and the Fresnel's lens 18 is formed only in a region corresponding to the central region of the piezoelectric member 12. The portion of the common electrode 14, on which the Fresnel lens 18 is not formed, may be left being exposed; however it is preferable that barrier members 51*a* and 52*b* capable of preventing an ultrasonic wave from being radiated into the ink liquid 20, should be provided as can be seen in FIG. 6. The barrier members 51*a* and 51*b* are formed to be leveled with the Fresnel lens 18 in surface. The barrier members 51*a* and 51*b* are made of a material different from that of the Fresnel lens 18, that is, for example, silicon resin.

Figure 7:
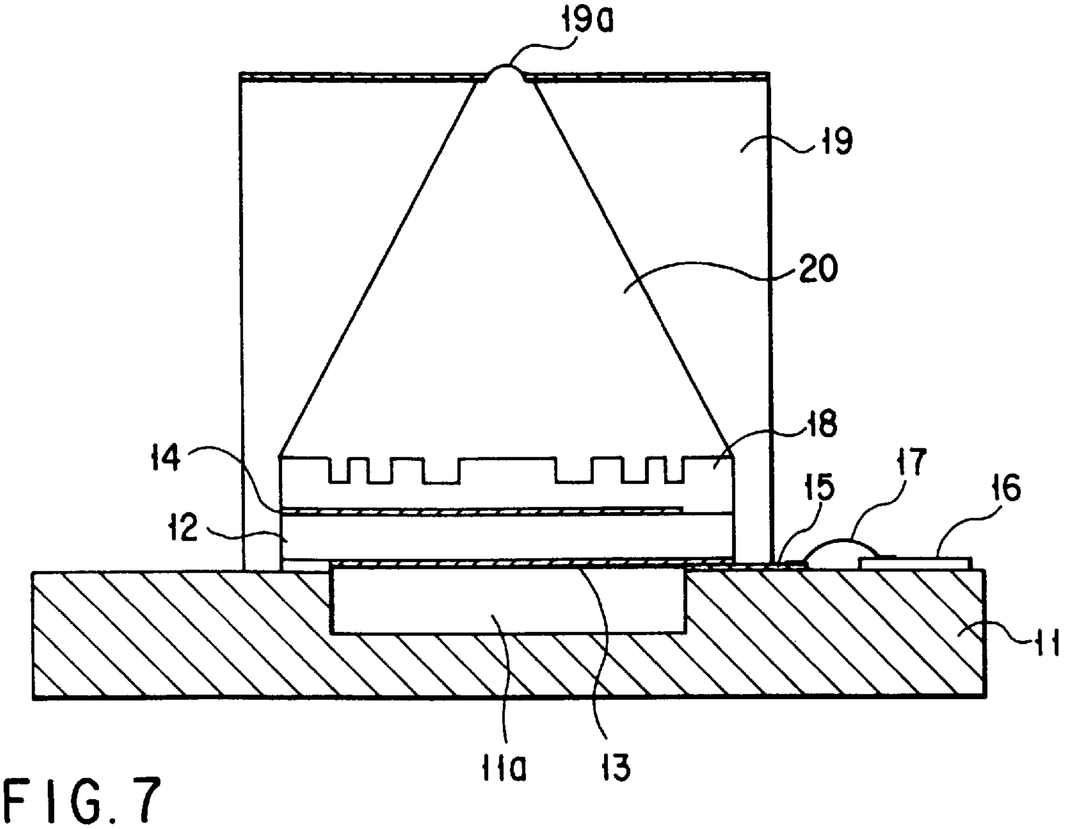
FIG. 7 is a cross-sectional view schematically illustrating a head portion of an ink jet recording apparatus according to a sixth embodiment of the present invention.

FIG. 7 is a diagram showing an ink jet recording apparatus according to another embodiment, having a structure similar to that of the second embodiment, except that the sub-electrodes 13 and the common electrode 14 are formed be alternately in the sub-scanning direction. More specifically, the sub-electrodes 13 extend from one end of the piezoelectric member 12 a half way through towards the other end in the sub-scanning direction, whereas the common electrode 13 extends from the other end of the piezoelectric member 12 a half way through towards the one end in the sub-scanning direction.

The present invention will now be described with reference to the following Examples; however it should be noted that the present invention is not limited to these examples.

EXAMPLE 1

In this example, an ink jet recording apparatus having a structure shown in FIG. 3 was prepared.

As the piezoelectric member 12, lead titanate-based piezoelectric ceramic having a thickness of about 0.5 mm and a dielectric constant of 200 was used. On the respective surfaces of the piezoelectric member, Ti/Au electrode layers one having a thickness of 0.05 $\mu$m and the other having a thickness of 0.2 $\mu$m, were formed by the spattering method, and an electrical field of 3 kV/mm was applied to the piezoelectric member 12 so as to carry out a polarization process. After that, the electrode layer on one surface of the piezoelectric member 12 was patterned by etching, and thus sub-electrodes 13 were formed such that the width of one piezoelectric element becomes 60 $\mu$m and the interval between adjacent sub-electrodes becomes 25 $\mu$m (the arrangement pitch of the sub-electrodes was 85 $\mu$m). Further, the width of the piezoelectric member 12 in the sub-scanning direction was set at 5 mm.

Ti/Au array electrodes 15 were formed on the glass supporting member 11, and then a groove 11*a* for creating a hollow structure between this and the piezoelectric element, was made by mechanical process to have a depth of 0.2 mm and a width of 2.2 mm. Then, while aligning the sub-electrodes 13 on the piezoelectric member 11 and the array electrode 15 on the glass supporting member 11 with each other, they are adhered to each other with conductive epoxy resin, and pressed against each other such that both electrodes are electrically connected to each other. During this period, the piezoelectric member 12 is brought into contact with the glass supporting member 11 at both ends by 1.4 mm in each end, in the sub-scanning direction.

Next, the piezoelectric member was polished to have a thickness of 50 $\mu$m, and then the common electrode 14 made of aluminum was formed to have a thickness of 0.3 $\mu$m by the spattering method. The length of the electrode in the sub-scanning direction, that is, aperture, was set at 2.0 mm.

Subsequently, in order to prepare the Fresnel lens 18 which also serves as the acoustic matching layer, epoxy resin and alumina powder was blended at such a ratio that the acoustic velocity becomes close to $3\times10^3$ m/sec, and thus a mixture having a density of $2.20\times10^3$ kg/m$^3$ and a sonic velocity of $2.95\times10^3$, was obtained. The mixture was applied on the upper surface of the common electrode 14 and cured, followed by the polishing until the thickness thereof becomes 45 $\mu$m. After that, a groove having a depth of ½ wavelength (about 30 $\mu$m) was made in parallel with the main scanning direction, such that the focal distance becomes 2.5 mm, thus constituting the Fresnel lens 18. Further, the ink holding chamber 19 was provided such that the distance between the ultrasonic wave radiating surface and the surface of ink liquid was about 2.5 mm, and further the drive circuit 16 was placed, thus completing an ink jet recording apparatus of the present invention.

COMPARATIVE EXAMPLE 1

An ink jet recording apparatus was manufactured in a similar manner to that of Example 1 except that a groove 11*a* was not made in the supporting member 11. In this ink jet recording apparatus, the lower surface of the piezoelectric member 12 is brought into direct contact with the supporting member 11 via the sub-electrodes.

With regard to the two recording apparatus manufactured in Example 1 and Comparative Example 1, the emission of ink droplets was tested. First, of the conditions under which the emission of ink droplet occurred at 100% by drawing a line in the main scanning direction in the case of the head of Example 1, those conditions having a drive voltage and a less number of burst waves were obtained. Under such conditions, the ink droplet emission test with use of the recording apparatus of Comparative Example 1 was carried out. The result indicated that although a rise of the surface of the ink liquid occurred, the emission of a droplet was not observed. Then, with use of the recording apparatus of Comparative Example 1, the number of burst waves was fixed to the condition obtained in the above-described test. In this state, while the drive voltage was gradually increased, the condition under which the emission of ink droplets in a linear manner, occurred at 100% in the main scanning direction was searched. It was observed that a voltage twice as high as the minimum necessary voltage achieved by the recording apparatus of Example 1 was necessary. In the meantime, with regard to the recording apparatus of Comparative Example 1, while fixing the drive voltage and gradually increasing the number of burst waves, the condition under which the emission of ink droplets in a linear manner, occurred at 100% in the main scanning direction was searched. It was observed that the number of burst waves 2.4 times as many as the minimum necessary number of burst waves achieved by the recording apparatus of Example 1 was necessary.

As can be understood from the above examples, the ink jet recording apparatus of the present invention can improve the ink droplet emission rate of twice as high or higher as compared to the case of the ink jet recording apparatus of Comparative Example 1. Therefore, a very low power consumption and a very high-speed recording can be achieved.

As described above, in the ink jet recording apparatus of the present invention, the piezoelectric element is supported by the supporting member on the opposite side to the ultrasonic wave focusing means without the element being in contact with the supporting member. With this structure, there is substantially no reflection of an ultrasonic wave from the rear surface side of the piezoelectric element, or the vibration of the piezoelectric element is not damped. Therefore, the pressure of the ultrasonic wave radiated into the ink liquid can be increased, and thus ink droplets can be emitted at a high efficiency for a low drive voltage and the low number of burst waves. Consequently, a high-speed recording and a low power consumption can be achieved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. An ink jet recording apparatus, comprising:

an ink holding chamber for holding ink liquid therein;

ultrasonic wave generating means having a piezoelectric transducer structure comprising a piezoelectric member, and first and second electrodes formed on opposing surfaces of the piezoelectric member, said piezoelectric transducer structure being coupled acoustically with the ink liquid;

drive means for driving said piezoelectric transducer structure;

ultrasonic wave focusing means provided over the ultrasonic wave generating means and including an acoustic lens for focusing an ultrasonic wave generated from the ultrasonic wave generating means in a vicinity close to a surface of the ink liquid; and a supporting member for supporting the ultrasonic wave generating means on an opposite side to the ultrasonic wave focusing means, wherein the supporting member supports the ultrasonic wave generating means with an ultrasonic wave canceling medium, in a region corresponding to an overlapping region between said piezoelectric transducer structure and the acoustic lens, and the piezoelectric member extends out of said piezoelectric transducer structure, and the ultrasonic wave generating means is supported by the supporting member at an extending portion of the piezoelectric member.

2. The apparatus according to claim 1, wherein the ultrasonic wave canceling medium has an acoustic impedance of 1/100 times or less an acoustic impedance of the piezoelectric member.

3. The apparatus according to claim 1, wherein the supporting member has a groove formed in the region corresponding to the overlapping region.

4. The apparatus according to claim 1, wherein the first electrode consists of a plurality of sub-electrodes extending in a sub-scanning direction and arranged apart from each other in parallel with each other.

5. An ink jet recording apparatus, comprising:

an ink holding chamber for holding ink liquid therein;

ultrasonic wave generating means having a piezoelectric transducer structure comprising a piezoelectric member, and first and second electrodes formed on opposing surfaces of the piezoelectric member, said piezoelectric transducer structure being coupled acoustically with the ink liquid;

drive means for driving said piezoelectric transducer structure;

ultrasonic wave focusing means provided over the ultrasonic wave generating means and including an acoustic lens for focusing an ultrasonic wave generated from the ultrasonic wave generating means in a vicinity close to a surface of the ink liquid; and a supporting member for supporting the ultrasonic wave generating means on an opposite side to the ultrasonic wave focusing means, wherein the supporting member supports the ultrasonic wave generating means with an ultrasonic wave canceling medium, in a region corresponding to an overlapping region between said piezoelectric transducer structure and the acoustic lens, and the ultrasonic wave generating means is supported by the supporting member through bumps.

6. The apparatus according to claim 5, wherein the ultrasonic wave canceling medium has an acoustic impedance of 1/100 times or less an acoustic impedance of the piezoelectric member.

7. The apparatus according to claim 5, wherein the supporting member has a groove formed in the region corresponding to the overlapping region.

8. The apparatus according to claim 5, wherein the first electrode consists of a plurality of sub-electrodes extending in a sub-scanning direction and arranged apart from each other in parallel with each other.

* * * * *